June 13, 1933.　　　　F. E. STAHL　　　　1,913,861
HOIST
Filed April 3, 1931
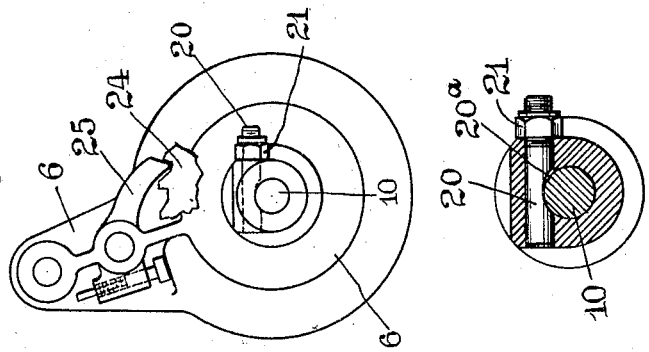
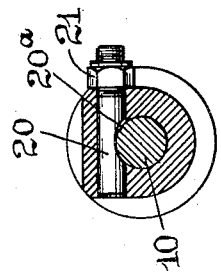
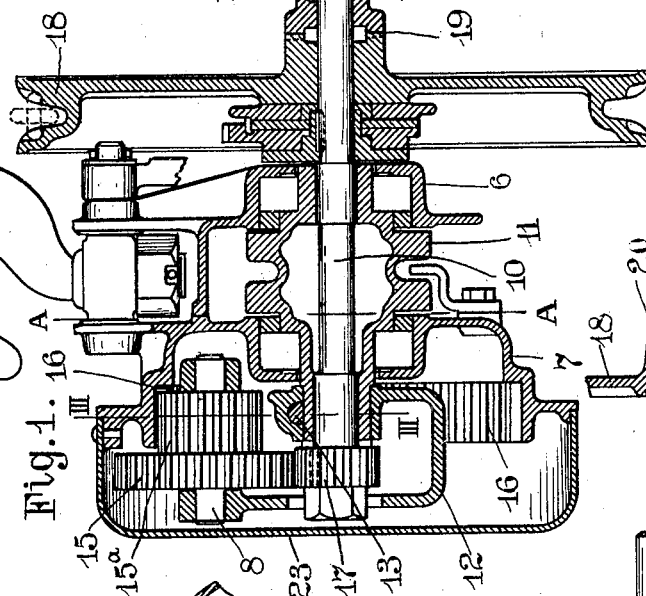
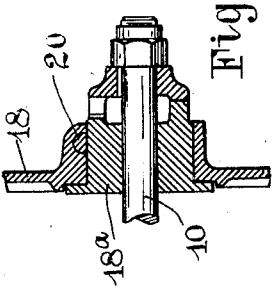
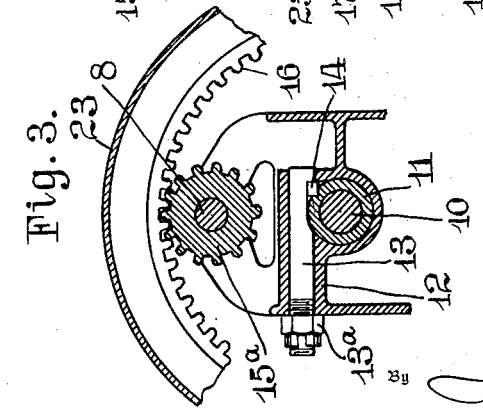
Inventor
FRANK E. STAHL
By
his Attorneys Patented June 13, 1933

1,913,861

UNITED STATES PATENT OFFICE

FRANK E. STAHL, OF TONAWANDA, NEW YORK, ASSIGNOR TO CHISHOLM-MOORE HOIST CORPORATION, OF TONAWANDA, NEW YORK, A CORPORATION OF NEW YORK

HOIST

Application filed April 3, 1931. Serial No. 527,507.

This invention relates to hoists and has for its object to provide an improved device of the kind that shall be economical in construction, light in weight, strong and durable. Another object is to provide means whereby the hoist cannot be overloaded and a third object is to provide improved means for attaching the gear cage to the load wheel. Other objects will appear from the disclosure herein.

The invention is embodied in the example herein shown and described, the feature of novelty being finally claimed.

In the accompanying drawing—

Figure 1 is a vertical section through the hoist with parts in full and parts broken out.

Fig. 2 is a view partly broken out and parts omitted looking at the right hand end of Fig. 1.

Fig. 3 is a fractional section on the line III—III Fig. 1 with parts in full.

Fig. 4 is a detail sectional view on the line IV—IV Fig. 1, showing in full the draw pin for clamping the jaw coupling to the drive shaft.

Fig. 5 is a side view of the draw pin for clamping a key to connect the gear cage with the load wheel.

Fig. 6 is a sectional view illustrating a modification.

Referring to the views the frame of the hoist is made up mainly of two integral parts 6 and 7 of cast aluminum. The dividing line between these frame parts is indicated at A—A, Fig. 1, the frame parts being so formed that the working parts can be readily assembled within, between and on them.

The character 10 designates a steel drive shaft, loose on which is the load wheel 11. The hub of the load wheel 11 has secured to it a gear cage 12 by means of a cut out draw pin 13 having a nut 13$^a$ thereon, said draw pin pinching a key 14 into the hub of the load wheel.

Supported on a shaft 8 in the gear cage 12 is a large idler or planetary gear 15 having fixed therewith a smaller off-set gear 15$^a$ meshing with an internal gear 16 in the frame part 7. The large gear 15 and its off-set gear 15$^a$ are driven by a pinion 17 keyed or fixed on the left hand end of the drive shaft 10.

The drive shaft is operated by a hand chain wheel 18 on the right hand end of said drive shaft. Rotary motion of the drive shaft 10, therefore, causes rotary motion of the load wheel at reduced speed because when the planetary or idler gear revolves it turns the gear cage which is attached to the hub of the load wheel. The connection between the gear cage and hub of the load wheel provides a positive drive due to the key with the addition of friction created by the pulling up of the draw pin 13 with the nut 13$^a$. With this construction the necessity of pressing, as heretofore, the gear cage on the hub of the load wheel is avoided. The gear cage can be slipped onto said hub and the key drawn tight with said draw pin and its nut 13$^a$.

The hand chain wheel 18 is held on the drive shaft by means of a jaw coupling 19 engaging the hand chain wheel, the said coupling 19 being clamped to the drive shaft 10 by means of a draw pin 20 having a rounded cut out portion 20$^a$ to fit or bear on the drive shaft so that when the said draw pin 20 is pulled up tight by the nut 21 thereon the jaw coupling is secured to the shaft with the tightness desired but with a predetermined slipping friction according to a given load. Hence when an unduly heavy load is imposed on the load wheel the jaw coupling will slip on the drive shaft or conversely and thereby prevent overloading the hoist.

In the modification illustrated in Fig. 6, the hand chain wheel is shown as mounted on a clutch hub 18$^a$ to which hub the hand chain wheel is connected by means of a draw pin 20 shown in Fig. 4. When the draw pin 20 is drawn up by the nut thereon the desired friction is created between the hand chain wheel and the said hub and power transmitted through the end jaw clutch to the drive shaft, said clutch in the modification being keyed to said drive shaft. In this instance also the hoist will function in operation until a predetermined load has been applied to the hand chain for which the draw pin has been set, after which the hand chain wheel will slip on its hub. In other words the draw pin can be set to exert the necessary pressure for any predetermined maximum load to be raised by the hoist, and beyond this load the hand chain wheel will slip.

The hoist is shown as provided, at its right hand end, with a ratchet 24 engaged with the drive shaft 10 and a pawl 25 pivoted to the frame part 6, and engaged with the ratchet, but removable at will from the ratchet, said pawl and ratchet when engaged to hold the load in any of its elevated positions.

A removable cover, as shown at 23, which also may be of aluminum, can be provided.

The forms of the parts can be changed without departing from the gist of the invention as claimed.

What I claim is:

1. In a hoist mechanism having a drive shaft and a hand chain wheel, a regulable friction means coupling said hand chain wheel with said drive shaft, said regulable friction means including a draw pin having a cut away portion to effect the connection of the hand wheel with the drive shaft and a nut on said draw pin for predetermining the quantity of friction to be exerted by said draw pin on said shaft.

2. In a mechanism of the kind described, a frame, a drive shaft, a load wheel loose on said shaft, a reducing gear and a cage therefor, a pinion on the drive shaft engaging said reducing gear, and a draw pin and a key held by the draw pin securing said cage to said loose load wheel.

3. In a hoist mechanism, a frame comprising two parts, one of which is provided with an internal gear, a drive shaft journaled in said frame, a load wheel loose on said shaft, a hand wheel on one end of said shaft, a draw pin friction means connecting said hand wheel with said shaft to predetermine the load lifting capacity of the hoist, a reducing gearing and cage therefor on the other end of said drive shaft, said reducing gearing engaging said internal gear, a draw pin and key engaging said gear cage with said load wheel, and a pinion on said drive shaft operably engaging said reducing gearing.

FRANK E. STAHL.